Nov. 3, 1959   R. R. GASPER   2,910,896
TEMPLATE CONTROLLED ARTICLE POSITIONING MECHANISM
Filed April 16, 1958   3 Sheets-Sheet 2

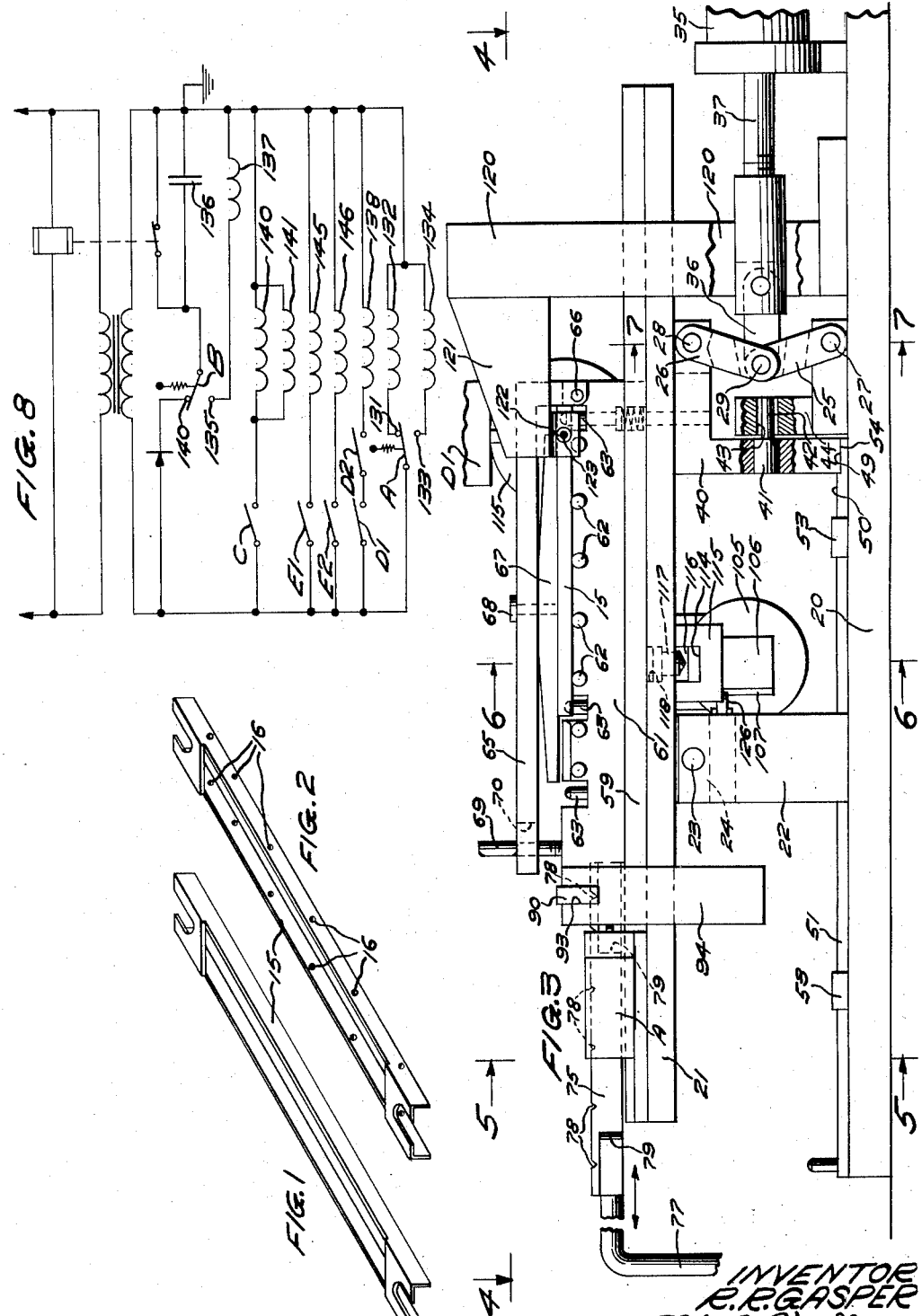

INVENTOR
R.R.GASPER
BY R.P. Miller
ATTORNEY

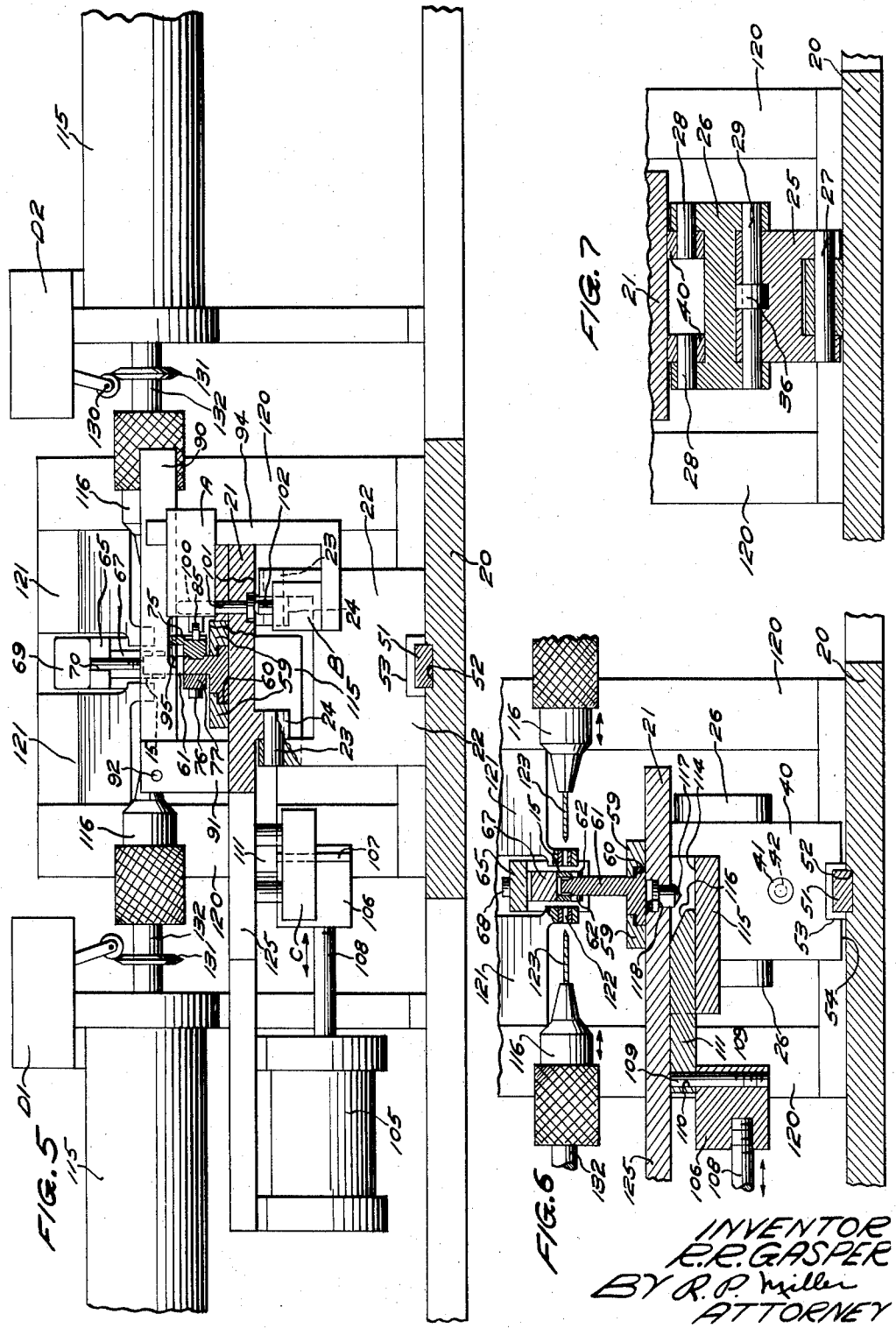

United States Patent Office 2,910,896
Patented Nov. 3, 1959

2,910,896

TEMPLATE CONTROLLED ARTICLE POSITIONING MECHANISM

Robert R. Gasper, Clarendon Hills, Ill., assignor to Western Electric Company, Incorporated, New York, N.Y., a corporation of New York Application April 16, 1958, Serial No. 729,017

9 Claims. (Cl. 77—21)

This invention relates to a work-holding mechanism for a fabricating machine and more particularly to new and useful improvements in a template controlled article positioning mechanism for selectively positioning an article with respect to a drilling mechanism.

In drilling operations where accuracy, speed and automatic control are extremely important, a problem exists in accurately and sequentially positioning a workpiece to be drilled without adversely affecting the overall speed of loading, feeding and drilling operations. This problem is even further enlarged when there is a need for a cooperating clamp structure which gives a positive clamping action and yet allows for variations in the size and movement of the workpiece.

It is a primary object of this invention to provide a mechanism for sequentially and accurately positioning a workpiece to be fabricated.

Another object of the invention is to provide a drilling machine wherein a detachable template is used to control the positioning of a workpiece with respect to a drill.

Another object of the invention is to provide a drilling machine having an automatically operated positive locking means for gripping a work holder.

A further object of the invention is to provide a work holder having a clamping means which will allow for variations in size and movement of the workpiece.

With these and other objects in view, the present invention contemplates an apparatus for automatically positioning and drilling workpieces wherein a work holder is slidably mounted in a pivotally mounted trackway. Self-retracting drill heads are spaced along the path of the work holder to move laterally thereto to drill holes in the workpiece. A template controls switch means in the path of the template to actuate mechanisms to move the trackway into drilling position and to lock the work holder in a predetermined drilling position in the trackway. The switches also actuate the self-retracting drilling heads. Switches are actuated by the retraction of the drilling heads to unlock the work holder to permit advance to a subsequent drilling position.

Other objects and advantages of the invention will become apparent by reference to the following detailed description and the accompanying drawings, wherein Fig. 1 is a perspective view of a workpiece before drilling;

Fig. 2 is a perspective view of the workpiece after drilling;

Fig. 3 is a side elevational view of a drilling machine having a workpiece holding mechanism embodying the principles of the present invention;

Fig. 5 is a cross sectional view along lines 5—5 particularly showing an arrangement of switches for controlling operation of the drilling machine;

Fig. 6 is a sectional view along lines 6—6 showing means for locking the work holding mechanism in position between the drilling heads;

Fig. 7 is a sectional view along lines 7—7 showing a toggle mechanism for selectively positioning the work holding mechanism; and Fig. 8 is a schematic view showing the electrical circuit for operating the drilling machine.

Figure 4:
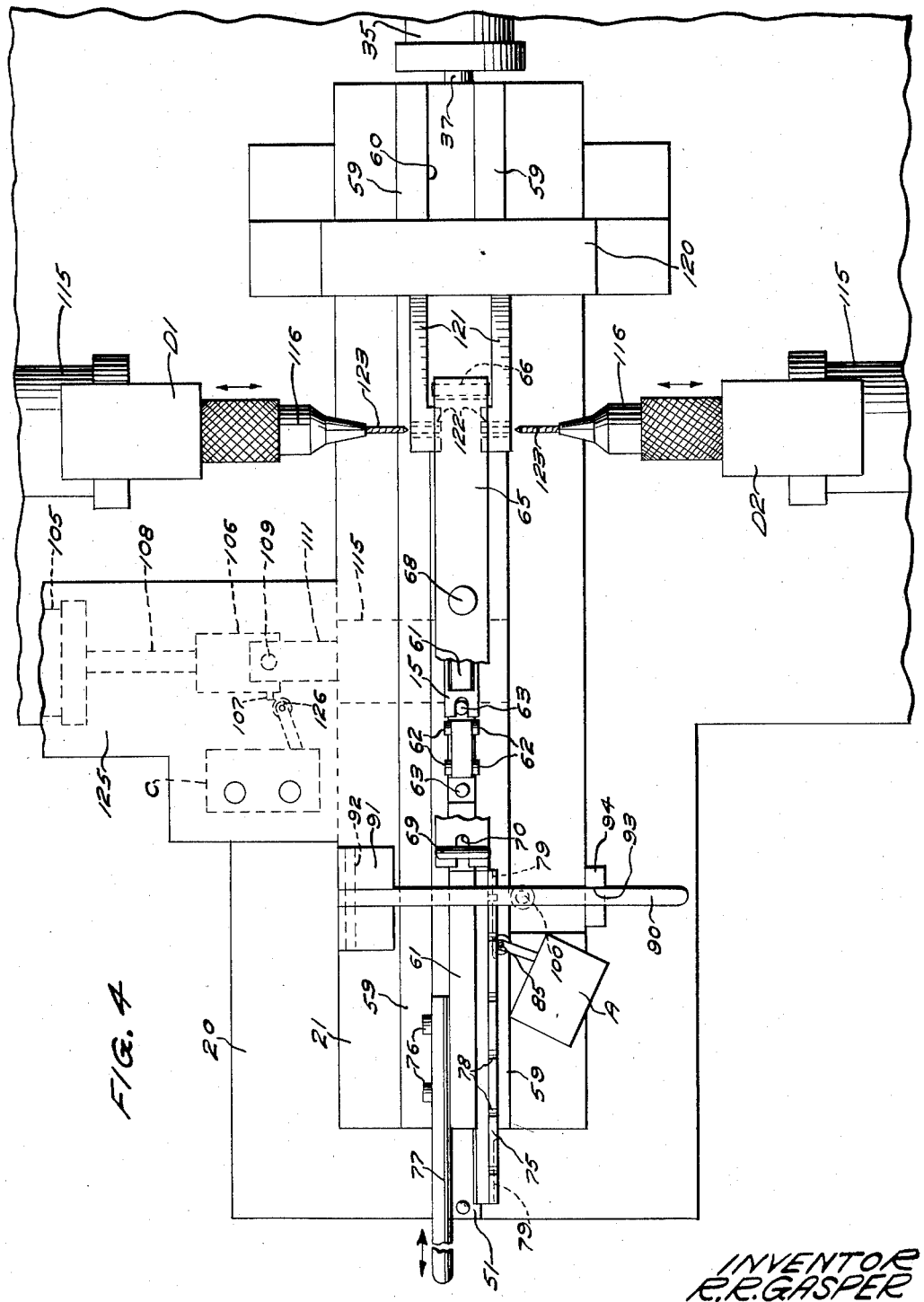
Fig. 4 is a plan view along lines 5—5 showing the relative position of a pair of drilling heads and a work holding mechanism.

Referring to Figs. 1 and 2, there is illustrated a channel shaped workpiece 15. Fig. 1 illustrates the workpiece before drilling and Fig. 2 illustrates the piece after the staggered holes 16 are drilled in a predetermined pattern.

Illustrated in the drawing is a drilling machine (Figs. 3, 4, 5 and 6) having a base 20 and a plate 21 pivotally mounted on a projection 22 of the base by a pin 23 inserted in the projection 22 and in a projection 24 extending from the underside of the plate 21. A toggle mechanism interconnects the base 22 and the plate 21 and consists of a pair of linkages 25 and 26 pivotally mounted to the base and the plate by pins 27 and 28 respectively and to each other by a pin 29. The toggle mechanism is connected by a member 36 to an air cylinder rod 37 of an air cylinder 35. Air cylinder 35 is rigidly mounted on base 20.

An L-shaped member 40 is mounted on the underside of plate 21 and has a positioning pin 41 with a surface 42 projecting into an opening 43 formed in a projection 44 extending upwardly from the base 20. When the air cylinder 35 is actuated to move rod 37 and member 36 to the right (Fig. 3), the toggle linkages 25 and 26 straighten and the surface 42 of the pin 41 engages the upper wall defining the opening 43 to limit upward movement of plate 21. Step surfaces 49 and 50 are formed on a sliding member 51 that is mounted in a slot 52 (Fig. 6) cut in the base 20. The slide member is retained in the slot 52 by a pair of guide members 53 and is adapted to be moved to selectively engage surfaces 49 and 50 with the lower surface of the projection 40. The lower position of plate 21 is thus determined by the selective engagement of projection 40 with either surface 49 or 50.

Plate 21 has a pair of horizontally spaced guide gibs 59 secured thereto to form a slot 60 to slidably receive a work holder 61. Work holder 61 has a series of horizontal parallel gage pins 62 to support the workpiece 15. Also, a set of three vertical support pins 63 are mounted on the slide 61 to longitudinally locate the workpiece 15. An L-shaped clamping beam 65 is pivotally mounted to the work holder 61 by a pin 66. A work engaging force equalizer bar 67 is pivotally mounted on the beam 65 by a pin 68. The clamping bar 67 is held against the workpiece 15 by the beam 65 which has a wing-head clamping screw 69, inserted through a slot 70 formed in the beam 65, threadably secured in work holder 61.

A template 75 is detachably mounted to a side of the work holder 61 by screws 76 which also secure a handle 77 to work holder 61. Template 75 is provided with a series of notches 78 in the upper surface and a series of cam surfaces 79 formed on the side. A switch A is mounted on plate 21 with an actuating arm and a roller 85 (Figs. 4 and 5) in the path of the cam surfaces 79. Switch A is therefore positioned to respond to the cam surface 79 on the side of template 75 as the template is moved with the work holder to the right within in gibs 59. The actuation of switch A by the cam surface 79 actuates the air cylinder 35 to selectively position plate 21 with respect to the base 20.

A latch bar 90 (Figs. 3, 4 and 5) is pivotally mounted on a plate projection 91 by a pin 92 to move into a slot 93 of a plate projection 94. The latch bar 90 has a V-shaped edge portion 95 to engage the notches 78 formed in the template 75. When template 75 is positioned beneath bar 90 to allow edge 95 to move within a notch 78 of the template, the bar 90 engages a pin 100 which is slidably mounted in an opening 101 provided in the plate 21. The pin 100 in turn moves an actuating arm 102 of a switch B mounted on the plate 21 (Fig. 5) to close a circuit (Fig. 8) that controls the actuation of an air cylinder 105 that functions to advance a rod 108 toward the right and move a link 106 having a cam surface 107 formed thereon. A pin 109 (Fig. 6) connects the link 106 with a wedge 111. Wedge 111 is guided in slot 114 of a channel 115 and has an inclined surface 116. A pin 117 is slidably mounted in an opening 118 formed in the plate 21 and is moved upwardly, by the engagement therewith of the inclined surface 116 of the wedge, to engage and lock the work holder within the gibs 59.

A switch C is mounted on a projection 125 extending from the plate 21 (Figs. 4 and 5) and has an actuating arm and a roller 126 (Figs. 4) in the path of cam 107 formed on the link 106 that is actuated by air cylinder 105. Switch C is thereby closed by the cam 107 after the locking wedge 111 has moved the pin 117 to lock the slide 61 in the gibs 59 (Fig. 6). A pair of self-retracting drill actuators 115 which are mounted to base 20 and operated by the closing of the switch C to move drilling heads 116 laterally to drill the workpiece 15. An inverted U-shaped member 120 is rigidly mounted to the base 20 and has a pair of projections 121 extending therefrom. Bushings 122 are inserted in projection 121 to guide the drills 123 and serve to guide the drilling heads 116 when said heads are moved to drill the workpiece.

A pair of normally open switches D1 and D2 are rigidly mounted to drill actuators 115 and have actuating arms and rollers 130 in the path of a pair of cams 131 (Fig. 5) that are mounted on a pair of spindles 132 moved by the drill actuators 115. Upon return of drill heads 116, normally open switches D1 and D2 (Figs. 4, 5 and 8) are closed by the cams 131 (Fig. 5) to actuate air cylinder 105 to move rod 108, link 106 and wedge 111 to the left (Fig. 6) to release pin 117 from locking engagement with slide 61.

*Operation*

To drill holes 16 (Fig. 2) the part 15 is placed over the holder 61 to rest on the pins 62 and 63 (Fig. 3). The clamping beam 65 is brought down against the workpiece, the wing-headed screw 69 passing through the slot 70 in the bar 67. Wing headed screw 69 is then tightened to force bar 67 toward slide 61 to grip workpiece 15 therebetween.

With the latch bar 90 pivoted out of the path of the template, the work holding slide 61 is moved within the gibs 59 until the attached template 75 is in the path of bar 90. Bar 90 is then lowered into engagement with the template and the template and the slide 61 are moved to the right (Figs. 3 and 4) by handle 77. Before latch bar 90 is aligned with a notch 78 of the template, the cam surface 79 of the template engages the arm and roller 85 to operate switch A into engagement with a contact 131 (Fig. 8) to energize a solenoid 132 that controls the operation of the air cylinder 35. The operation of the air cylinder 35 thereupon moves the rod 37 and its connected link 36 to the right (Fig. 3) to straighten the toggle link 25 and 26. In so doing the links 25 and 26 move the plate 21 upward. This upward movement of plate 21 will continue until surface 42 of pin 41 secured to plate projection 40 strikes the upper surface of the opening 43 in the base projection 44. Thus, plate 21 is moved into an upper position determined by the surfaces 42 and 43.

If it is desired to drill hole 16 at a lower position in part 15, cam surfaces of the template will move switch A into engagement with contact 133 (Fig. 8) to energize a solenoid 134 that controls the cylinder 35 to move toggle linkage 25 and 26 so that surface 54 of plate projection 40 comes to rest against the surface 49. This provides a lower drilling position for the work holder 61. The lower drilling position of the work holder 61 can be adjusted by movement of the slide 51 toward the right thus bringing surface 50 into alignment with the projection 40. Surface 50 being higher than surface 49, provides a means for selectively positioning the work plate with respect to the drill head 116.

Upon continued movement of template 75 and work holder 61 to the right (Figs. 3 and 4), after switch A has been actuated into engagement with contact 133 by the cam surface on template 75 to position the plate 21, the latch bar 90 will drop into a notch 78 of the template 75. When the edge 95 of bar 90 moves into a notch 78, bar 90 will move pin 100 down to move actuator 102 of switch B to close switch B through contact 135 (Figs. 5 and 8). This closing of switch B against contact 135 (Fig. 8) discharges condenser 136 (Fig. 8) to energize a solenoid 137 that actuates the air cylinder 105 to move rod 108, link 106 and connected wedge 111 to the right (Fig. 6) in slot 114 formed by the channel 115. As wedge 111 moves to the right, surface 116 will engage and move pin 117 up against work holder 61 to lock the holder within the gibs 59.

During the movement of link 106 to the right, the cam 107 on link 106 will close switch C (Figs. 4, 5 and 8) by engaging the roller 126. The closing of switch C (Fig. 8) energizes solenoids 140 and 141 to cause the actuation of the self-retracting drill actuators 115 to move drills 123 through guide bushings 122 of base extension 121 and into engagement with the workpiece (Fig. 4).

Upon a predetermined movement of the drilling heads 116, the switches E1 and E2 (Fig. 8) contained in the self-retracting drill actuators 115, will be closed to energize solenoids 145 and 146 to cause the self-retracting drill actuators 115 to retract the drilling heads 116 and likewise the drills 123 from the workpiece 15 and the bushings 122.

After the drill actuators 115 have retracted drilling heads 116 a predetermined distance, the cam 131 on shaft 132 of the drilling apparatus will close normally opened switches D1 and D2 by engaging the actuator arms and rollers 130. With the closing of switches D1 and D2 (Figs. 4, 5 and 8), solenoid 137 is energized to actuate air cylinder 105 to move rod 108, link 106 and wedge 111 to the left (Figs. 5 and 6) and from engagement with pin 117, allowing pin 117 to drop to release work holder 61 in slot 60.

Air cylinder 105 will remain operated to hold rod 108 and likewise wedge 111 in the left hand position (Figs. 5 and 6) until the latch bar 90 is disengaged from pin 100 allowing spring-biased switch B (Figs. 5 and 8) to return to contact 140 (Fig. 8). The energizing circuit for the solenoid 137 controlling the forward operation of the air cylinder 105 is interrupted, and thus, drilling heads and the lock means will not move to operative position until latch bar 90 is raised to allow switch B to move to contact 140. In this position, switch B allows condenser 136 (Fig. 8) to be recharged.

Thus, moving latch bar 90 into a notch 78 again will move the switch B to contact 135 to discharge the condenser through the solenoid 137 to actuate the locking and drilling apparatus as before described. Thus, by raising the latch bar 90 and moving the template 75 and the work holder means 61 to the right (Figs. 3 and 4), the cam surfaces 79 will move switch A to contact 131 or 133; thus, controlling the actuating of the air cylinder 35 to position plate 21 accordingly. Upon further movement of template 75 to the right (Figs. 3 and 4), latch bar 90 will drop into a notch 78 to effectuate the actuation of the lock pin 117 and also the operation of the drilling heads as above-described while the cam surface 79 maintains the switch A on either contact 131 or contact 133 to actuate the air cylinder 35 to hold plate 21 in position.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a workpiece positioning mechanism comprising a movably mounted plate, a work holder movably mounted on the plate, means for moving said plate, and means operated by the movement of the work holder for operating said moving means.

2. In a work holder positioning mechanism, a movably mounted plate, a work holder movably mounted on said plate, means to position said work holder on the plate, means for locking said work holder on said plate, and means operated by the work holder positioning means for operating said locking means.

3. In a work piece positioning mechanism, a movably mounted plate, a work holder movably mounted on said plate, means for moving said plate, means operated by the movement of the work holder for operating said plate moving means, means for latching said work holder on the plate, means for locking said work holder in position on said plate, and means operated by the work holder latching means for operating said locking means.

4. In a workpiece positioning mechanism, a movably mounted plate, a work holder movably mounted on said plate, means for moving said plate, means operated by the movement of the work holder for operating said plate moving means, means for latching said work holder on the plate, a cam member slidably mounted on the plate, a pin slidably mounted in the plate perpendicular to the path of the work holder and in the path of the cam member, and means operated by the latching means to move the cam member into engagement with the pin for moving the pin against the work holder to lock the work holder on the plate.

5. In a workpiece positioning mechanism, a pivotally mounted plate, a toggle linkage for moving the plate, a workpiece holder slidably mounted on the plate, a template having a cam surface attached to the holder, means for sliding the holder to move the template and cam surface, and means operated by the cam surface for actuating the toggle linkage to move the plate.

6. In a workpiece positioning mechanism, a pivotally mounted plate, gibs mounted on said plate, a workpiece holder slidably mounted in said gibs, a template having a cam surface attached to said holder, a linkage connected to said plate, means for actuating said linkage for pivoting said plate, and means operated by the movement of said cam surface for operating said actuating means.

7. A drilling machine, comprising a base having a projection thereon, a plate pivotally mounted about a horizontal axis on the base projection, means to limit the pivotal movement of the plate, means to pivot the plate, a trackway mounted on said plate, a work holder slidably mounted in said trackway, locking means in said trackway to grip the work holder, means to actuate said locking means, drilling means movable laterally to the workpiece, means operated by said locking means for actuating the drilling means, drill guides mounted on said base, means to move said drill means, a template detachably mounted to said work holder, and template followers to sequentially actuate said plate pivoting means and said work holder locking means.

8. A drilling machine, comprising a base, a plate pivotally mounted to said base, a trackway rigidly mounted on said plate, a work holder slidably mounted on said trackway, clamping means mounted on said work holder to hold a workpiece, means to pivot said plate a predetermined distance to position said work holder, a template mounted on said work holder, said template having notches and cam surfaces thereon in predetermined positions, means operated by the cam surface of said template for actuating the plate pivoting means, drills slidably mounted to move laterally to the workpiece, means to lock said work holder in said trackway, a latch rigidly mounted on said plate to engage the notches of the template for positioning said template in said trackway, and means responsive to movement of the latch into the notches to actuate said lock and said drills.

9. A drilling machine, comprising a base, a plate pivotally mounted to said base, a trackway rigidly mounted on said plate, a work holder slidably mounted in said trackway, gage pins secured to the holder to position a workpiece, a clamping beam pivotally mounted on said clamping beam between the beam and the workpiece, a screw threaded into the work holder to force the clamping beam toward the work holder to grip the workpiece, a toggle mechanism linking said base and said plate to pivot said plate, stop means on said base and plate to limit movement to said work holder, said template having notches and cam surfaces thereon in predetermined positions, a switch means operated by the template cam surfaces for actuating the toggle mechanism, drills slidably mounted to move laterally to engage the workpiece, a pin slidably mounted in said plate to move into engagement with said work holder, a wedge movably mounted on said plate having an inclined surface in sliding engagement with said pin, a latch pivotally mounted on said base to enter the notches of the template for positioning said template and work holder in the trackway, and a switch means operated by the movement of the latch within a notch of the template to actuate said wedge and drills.

References Cited in the file of this patent

UNITED STATES PATENTS

| 2,300,253 | Hamilton et al. | Oct. 27, 1942 |
| 2,302,878 | Muhl et al. | Nov. 24, 1942 |
| 2,437,317 | Davis | Mar. 9, 1948 |
| 2,655,059 | Halvorsen et al. | Oct. 13, 1953 |
| 2,830,475 | Jones | Apr. 15, 1958 |